United States Patent
Shih (10) Patent No.: US 7,549,094 B2
(45) Date of Patent: Jun. 16, 2009

(54) METHOD FOR RECEIVING DATA BY A UNIVERSAL ASYNCHRONOUS RECEIVER TRANSMITTER

(75) Inventor: Pi-Yuan Shih, Taipei Hsien (TW)

(73) Assignee: Moxa Technologies Co., Ltd., Shing Tien (TW)

( * ) Notice: Subject to any disclaimer, the term of this patent is extended or adjusted under 35 U.S.C. 154(b) by 0 days.

(21) Appl. No.: 11/947,772

(22) Filed: Nov. 30, 2007

(65) Prior Publication Data

US 2008/0084947 A1    Apr. 10, 2008

Related U.S. Application Data (63) Continuation-in-part of application No. 10/905,536, filed on Jan. 9, 2005, now abandoned.

(51) Int. Cl.
  *G06F 11/00* (2006.01)
(52) U.S. Cl. .................................................. 714/704
(58) Field of Classification Search ................... 714/704
  See application file for complete search history.

(56) References Cited

U.S. PATENT DOCUMENTS 5,617,433 A * 4/1997 Suzuki ....................... 714/799

* cited by examiner

*Primary Examiner*—James C Kerveros
(74) *Attorney, Agent, or Firm*—Bacon & Thomas PLLC (57) ABSTRACT

The present invention discloses a method for receiving data by a universal asynchronous receiver transmitter, which includes a receive shift register (RSR), a receiver FIFO, a receiver buffer register (RBR), a line status register (LSR), and a good data length register (GDL). The RSR is connected to the receiver FIFO and the LSR in parallel. The receiver FIFO is further connected to the RBR, and the LSR is connected to the GDL. The receiver buffer register, the good data length register, and the line status register are connected to a microprocessor through a bus, such that when the receive shift register receives a plurality of serial data, the good data length register counts the number of correct data, and the microprocessor uses the count of the good data length register as a number of times for reading the receiver buffer register thereby enhance the performance of reading data.

3 Claims, 13 Drawing Sheets

METHOD FOR RECEIVING DATA BY A UNIVERSAL ASYNCHRONOUS RECEIVER TRANSMITTER

This application is a Continuation-In-Part of my patent application Ser. No. 10/905,536, filed on Jan. 9, 2005, now abandoned.

BACKGROUND OF THE INVENTION

1. Field of the Invention

The present invention relates to a method for receiving data by a universal asynchronous receiver transmitter. More particularly, the present invention relates to a method for receiving data by using a good data length register (GDL) installed in a universal asynchronous receiver transmitter to count the number of correct data so as to enhance the performance of reading data.

2. Description of Related Art

As communication originally refers to the communication of ideas or the exchange of information, but communication nowadays also includes a wireless or a cable transmission of multimedia information such as sound, image and text to a remote end. From the technical definition of communication, various signals can be sent successfully, efficiently and safely to a remote place after being coded and modulated, and an "electric" transmission function is used to rapidly and conveniently view a television program, make a phone call, listen to a radio broadcast, transmit a document as well as use a wireless or cable modem to send or receive emails through the Internet, browse a webpage and use an Internet phone, etc through the network.

At present, network has become the second largest medium, which is an indispensable information source to most people and an important channel for the communication between people. If a network transmission is considered as a highway, then every user must have a receiver transmitter for sending or receiving information distributed on the highway. As the transmitting speed is increasing constantly, the receiver transmitter must come with a fast operating speed as well. Now, the most popular receiver transmitter is the universal asynchronous receiver transmitter (UART) which is also known as the serial communication interface (SCI). This kind of universal asynchronous receiver transmitter is a serial interface RS-232 installed in an electronic product such as a general instrument, a computer or a PDA and it is the current mainstream of serial transmissions.

When universal asynchronous receiver transmitter transmits data, the operation time of transmitter and receiver is asynchronous. It means that the transmitter sent the data irregularly to receiver. In order to set the space between serial data, it will set a start bit and an end bit to transmit the serial data successfully.

Figure 1:
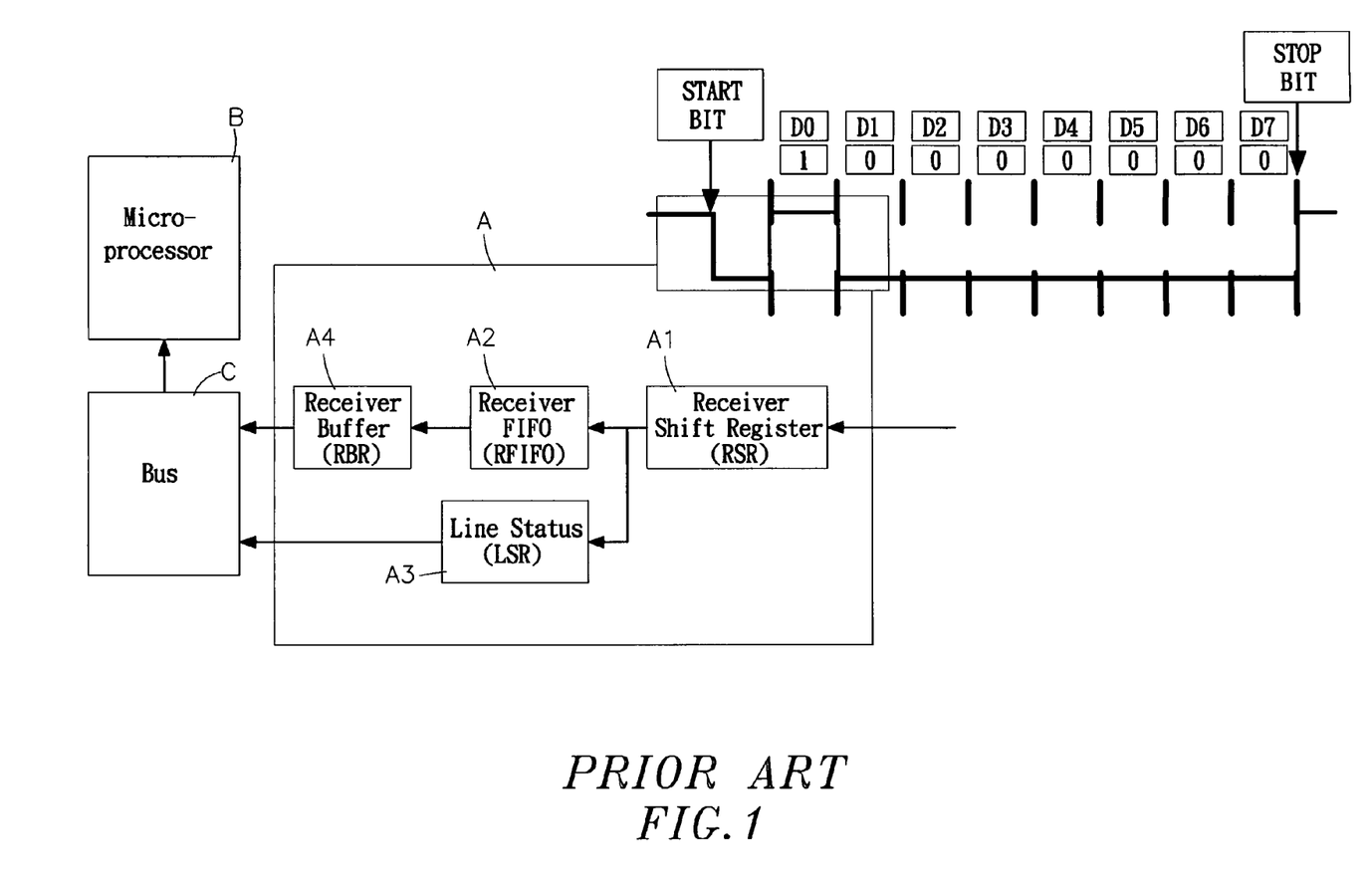
FIG. 1 is a block diagram of the process of reading data by a prior-art universal asynchronous receiver transmitter.
Figure 2:
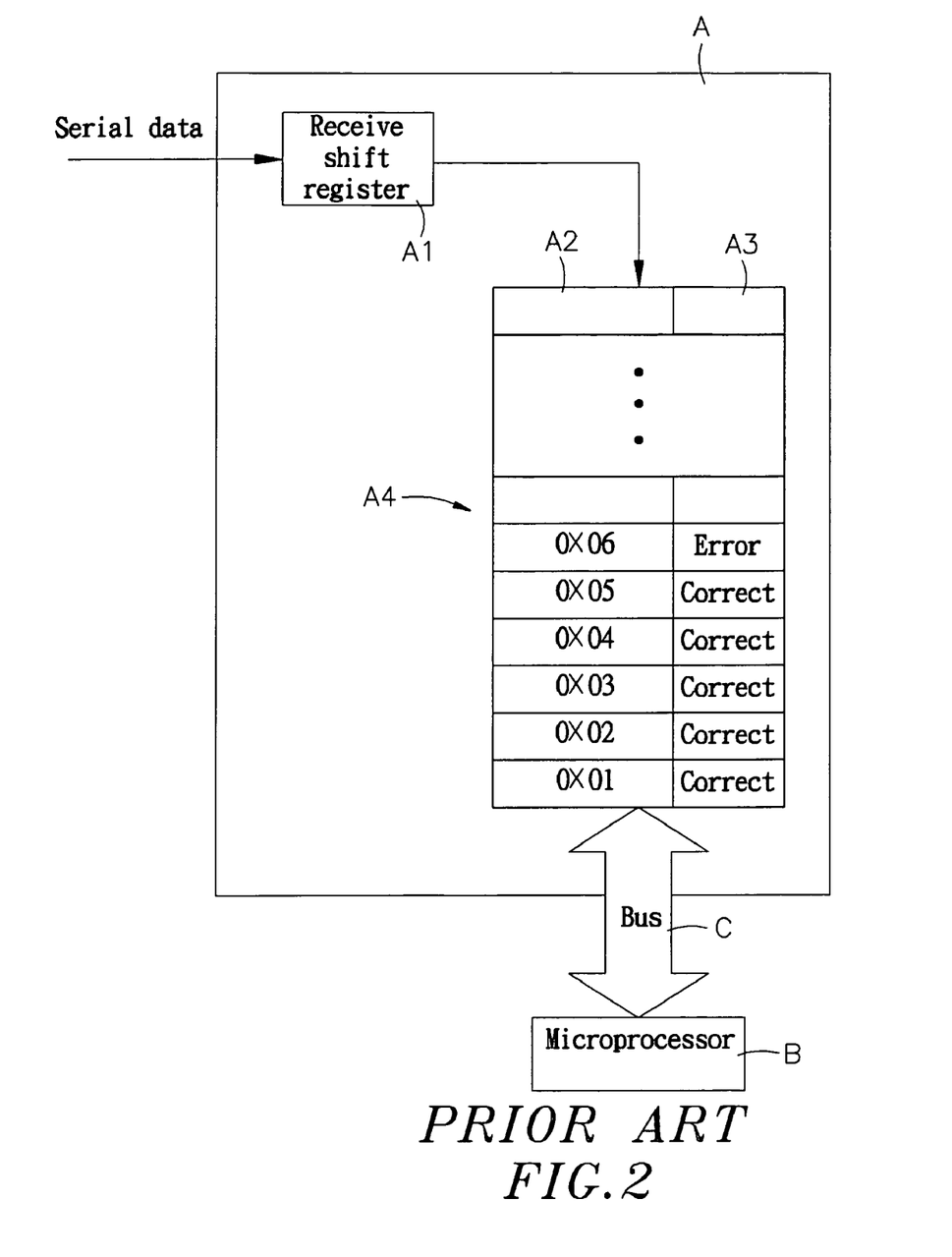
FIG. 2 is a first schematic view of the process of reading data by a prior-art universal asynchronous receiver transmitter.
Figure 3:
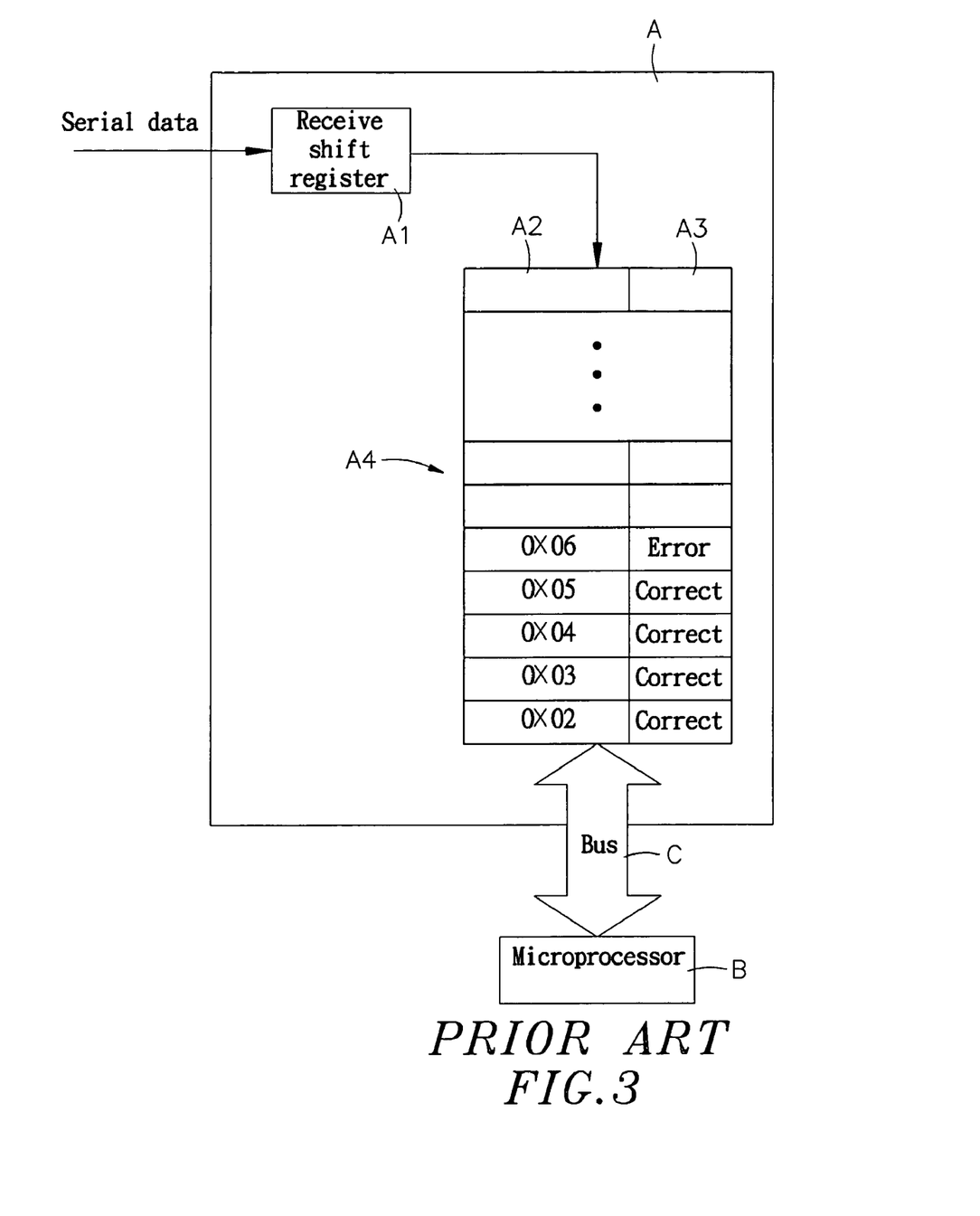
FIG. 3 is a second schematic view of the process of reading data by a prior-art universal asynchronous receiver transmitter.
Figure 4:
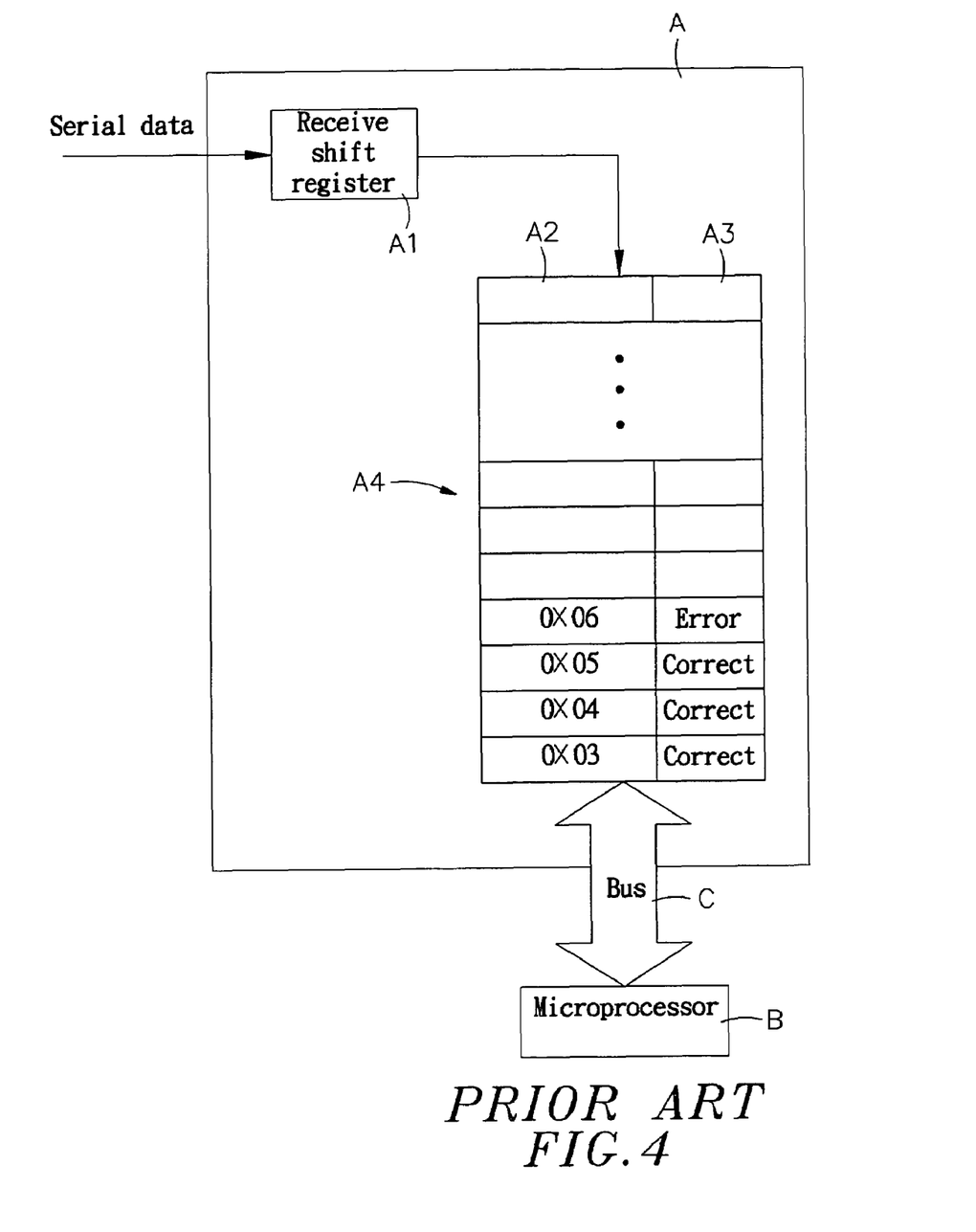
FIG. 4 is a third schematic view of the process of reading data by a prior-art universal asynchronous receiver transmitter.
Figure 5:
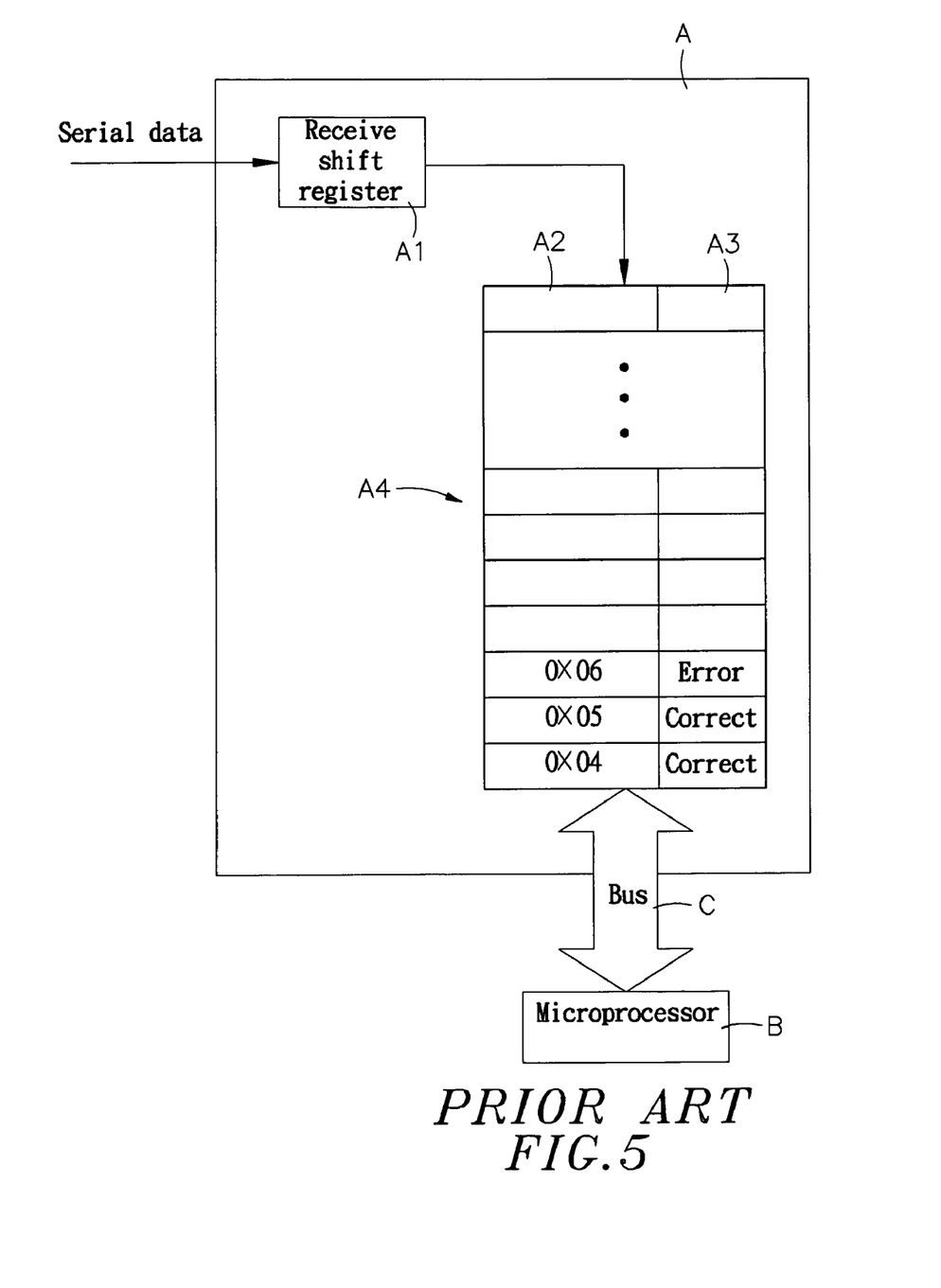
FIG. 5 is a fourth schematic view of the process of reading data by a prior-art universal asynchronous receiver transmitter.
Figure 6:
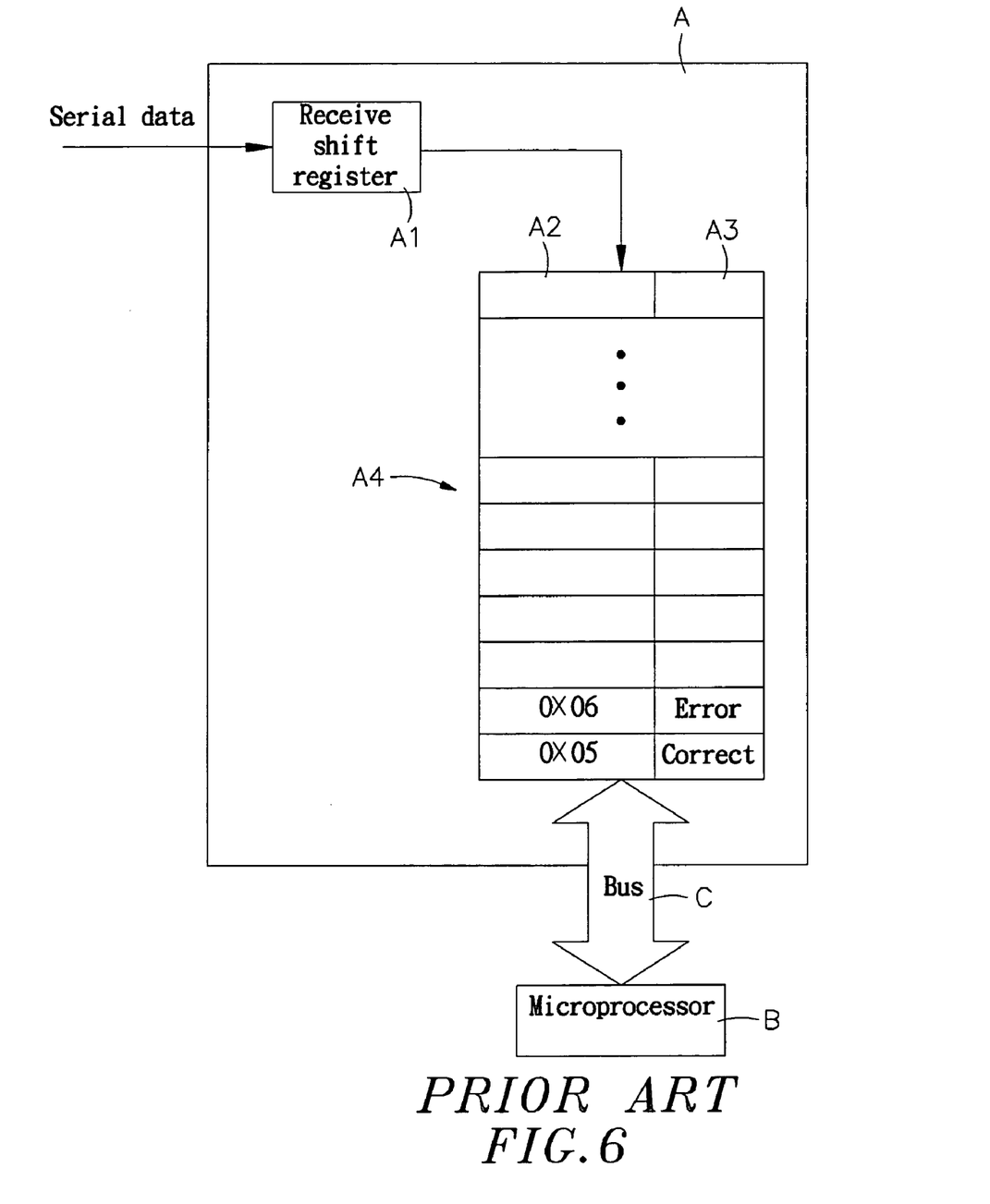
FIG. 6 is a fifth schematic view of the process of reading data by a prior-art universal asynchronous receiver transmitter.
Figure 7:
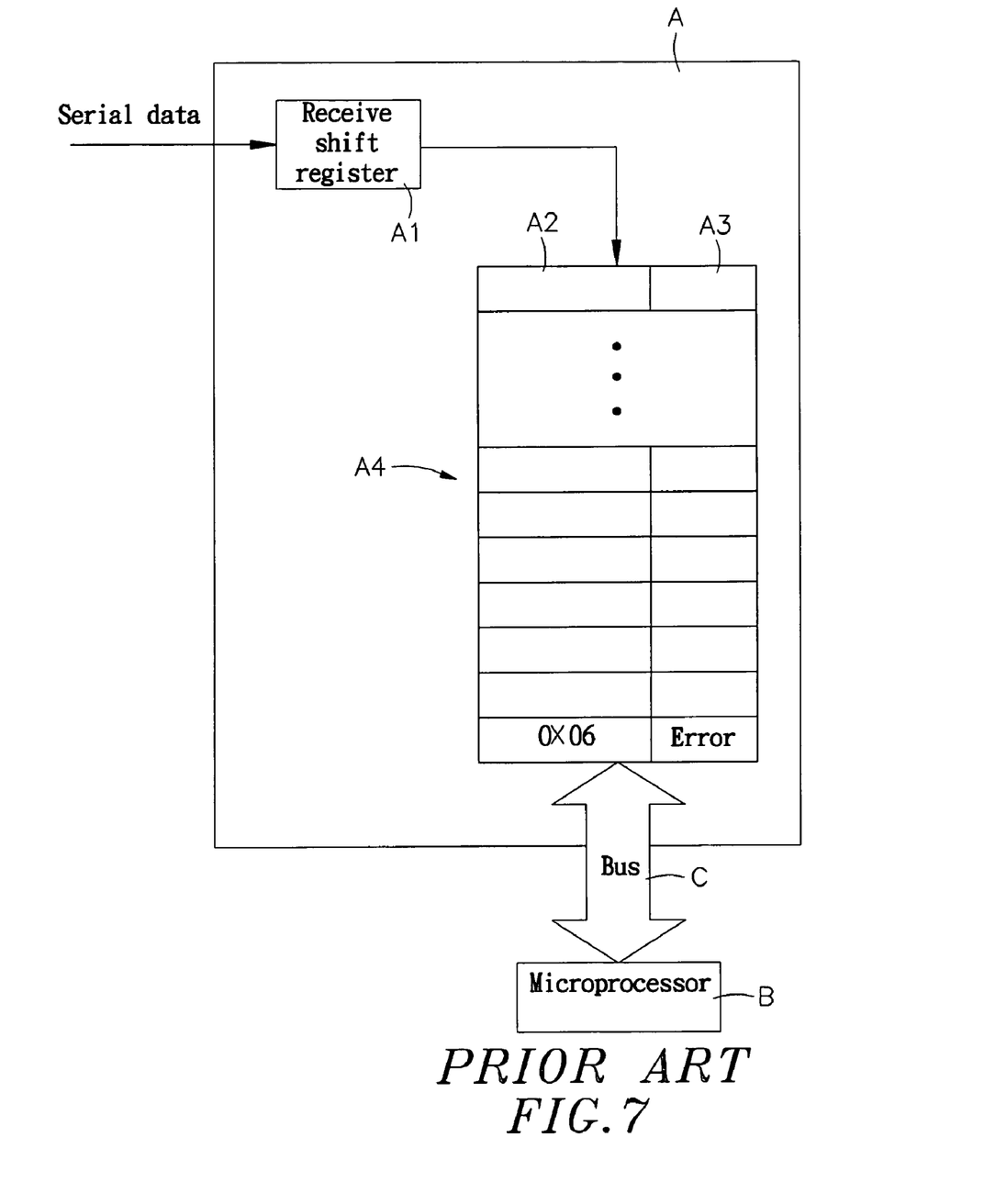
FIG. 7 is a sixth schematic view of the process of reading data by a prior-art universal asynchronous receiver transmitter.
Figure 8:
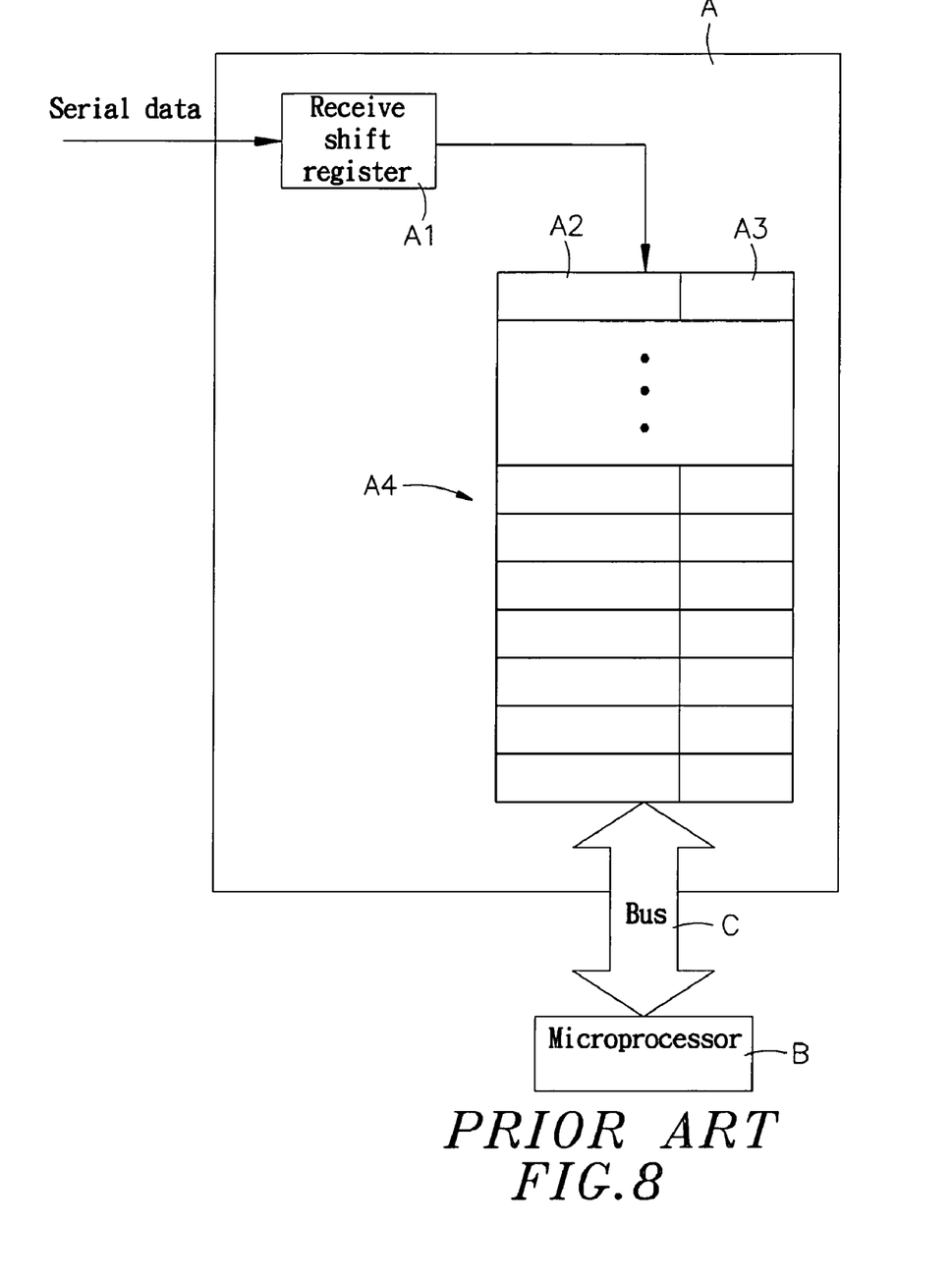
FIG. 8 is a seventh schematic view of the process of reading data by a prior-art universal asynchronous receiver transmitter.

Please refer to FIG. 1 for the schematic view of the process of reading data by a traditional universal asynchronous receiver transmitter. In the figure, when the universal asynchronous receiver transmitter A receives a serial data, the serial data is saved in a receive shift register (RSR) A1, and the receive shift register A1 also saves the start bit, end bit and data bits of each record of the serial data. However, since the receive shift register A1 has no mapping for the memory address, therefore the data of the receive shift register A1 cannot be accessed directly. After the receive shift register A1 has received an end bit, a data bit in the receive shift register A1 will be sent to a receiver FIFO A2, and a line status register A3 will identify whether the data is correct. In the process of receiving a serial data, an end bit should be received after all data bits are received. If an end bit is not received at that time, a frame error will occur. Further, if a parity check mechanism is enabled and the received parity bit is incorrect, then a parity error will be generated, and the parity bit in the line status register A3 sets as an error. If an end bit is received after all data bits are received, then the line status register A3 sets as correct. FIGS. 2, 3, 4, 5, 6, 7 and 8, show the schematic views of a process of reading data by a prior-art universal asynchronous receiver transmitter, wherein when a microprocessor B reads a serial data in the receiver buffer register A4 through a bus C, each record of data will be read twice sequentially, wherein during the first time, the microprocessor B will read the line status register A3 for gauging whether the data is correct or not, and then during the second time, according to the first time reading result, the microprocessor B+ will read the correct data stored in the receiver buffer A4 and read error data and stored in the line status register A3. In this example, six serial data stored in the receiver buffer A4 are read according to the aforementioned method, the microprocessor B will read 12 times including six times reading of the receiver buffer A4 and six times reading of the line status register A3.

However, when the foregoing prior-art universal asynchronous receiver transmitter A is receiving data, it is necessary to read every record of data twice before retrieving the data, and such process increases the workload of the microprocessor B and lowers its performance. The current electronic products emphasize on an all-in-one design, and the microprocessor B will be unable to process other work in a high performance or the processing speed will become very slow. Such prior art definitely causes inconvenience to users.

Therefore, it is desirable to provide a method for receiving data by a universal asynchronous receiver transmitter that eliminates the aforesaid drawbacks.

SUMMARY OF THE INVENTION

Therefore, it is a primary objective of the present invention to use a good data length register (GDL) installed in a universal asynchronous receiver transmitter, such that when a receive shift register receives serial data, the good data length register (GDL) counts the number of correct data marked in a line status register (LSR) increasingly, and a microprocessor bases on the count of the good data length register as the number of times for reading the serial data stored in a receiver buffer register (RBR) to enhance the performance of reading data.

DETAILED DESCRIPTION OF THE PREFERRED EMBODIMENTS

Figure 9:
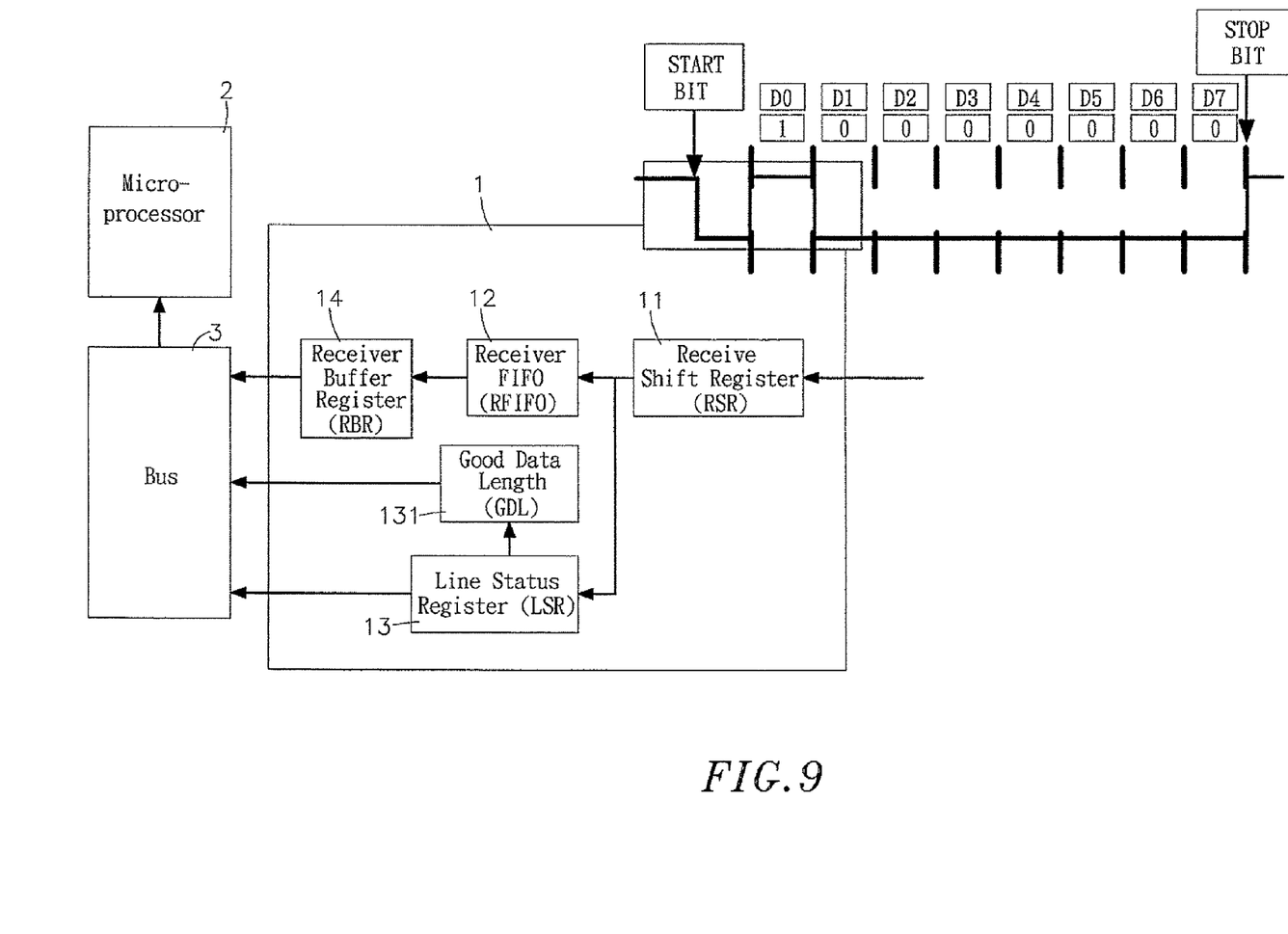
FIG. 9 is a block diagram of the process for reading data by a universal asynchronous receiver transmitter according to the present invention.

Please refer to FIG. 9 for the first schematic view of the process for reading data by a universal asynchronous receiver transmitter according to the present invention. In FIG. 9, a universal asynchronous receiver transmitter 1 comprises a receive shift register (RSR) 11 which is connected to a receiver FIFO (RFIFO) 12 and a line status register (LSR) 13 in parallel. The receiver FIFO 12 is connected to a receiver buffer register (RBR) 14 and the line status register 13 is connected to a good data length register (GDL) 131. The receiver buffer register 14, the good data length register 131, and the line status register 13 are connected to a microprocessor 2 through a bus 3.

Figure 10:
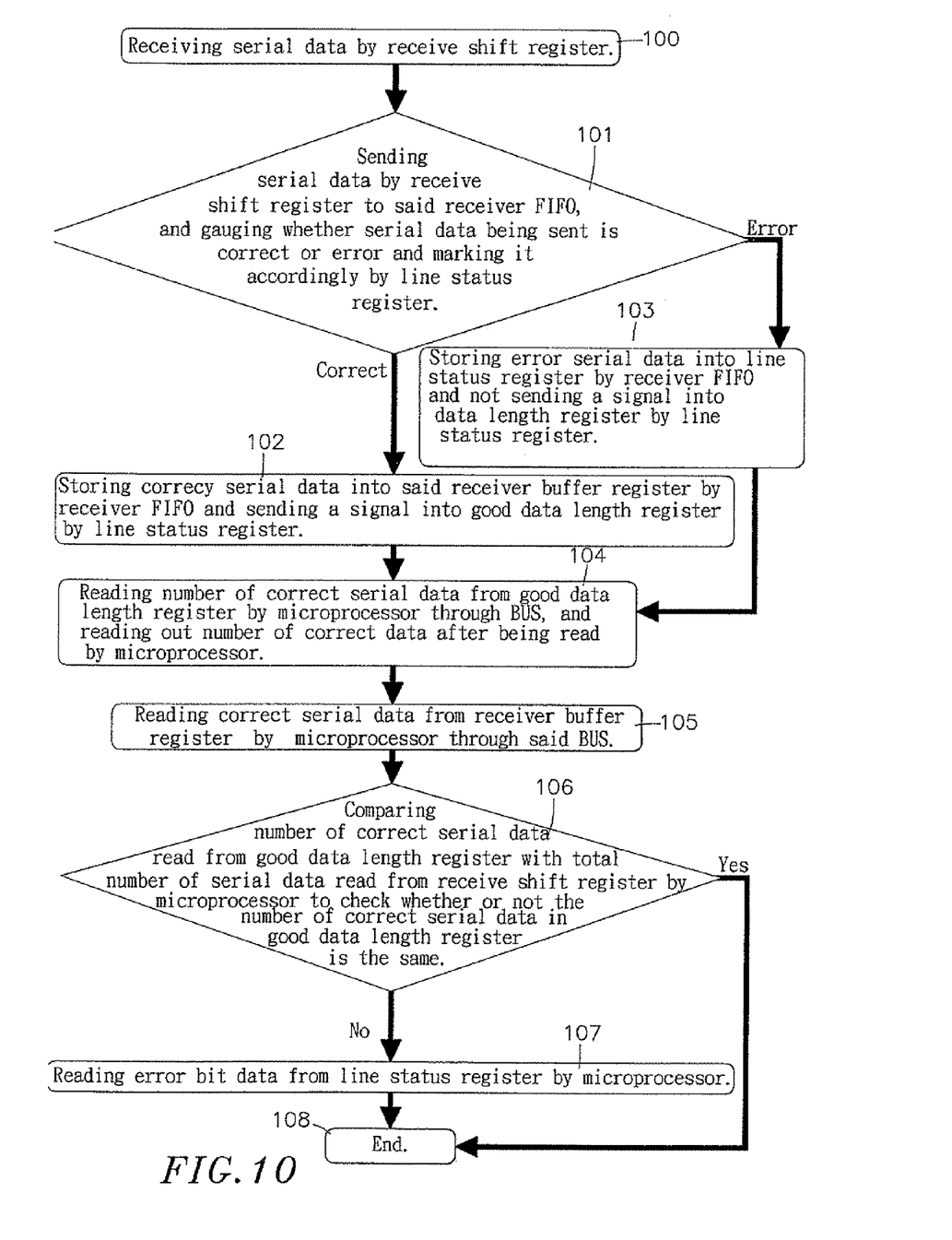
FIG. 10 is a flow chart of the process for storing and reading data by a universal asynchronous receiver transmitter according to the present invention.

Referring to FIG. 10, a flow chart of the process for reading data by a universal asynchronous receiver transmitter according to the present invention is described, which comprise the following steps.

At step 100, the receive shift register 11 receives the serial data, wherein the serial data includes a start bit, an end bit and data bits.

At step 101, the receive shift register 11 send the serial data to the receiver FIFO 12. Simultaneously, the line status register 13 gauges whether or not the serial data received by the receiver FIFO 12 is correct or error and to mark it accordingly, wherein if the serial data is marked correct, the process proceeds to step (102) and wherein if the data is marked error, the process proceeds to step (103).

At step 102, the receiver FIFO 12 stores the correct serial data into the receiver buffer register 14. Besides, when the line status register 13 gauges the serial data as a correct, a signal will be sent to the good data length register 131 for counting, then the process proceeds to step (104).

At step 103, the receiver FIFO 12 stores the error serial data into the line status register 13. Besides, when the line status register 13 gauges the serial data as error, no signal will be sent to the good data length register 131 for counting, then the process proceeds to step (104).

At step 104, the microprocessor 2 reads the number of correct serial data from the good data length register 131 through the bus 3, and the number of correct serial data will be read out after being read by the microprocessor 2.

At step 105, the microprocessor 2 reads the correct serial data from the receiver buffer register 14 through the bus 3.

At step 106, the microprocessor 2 compares the number of the correct serial data read from the good data length register 131 with the total number of serial data read from the receive shift register 11 a to check whether or not the number of the correct serial data in the good data length register 131 is the same. If the number of the correct serial data in the good data length register 131 is less than the total number of transmitted data, it will go to step (107). If it is not, the further step will be (108).

At step 107, the microprocessor 2 reads the error bit data from the line status register 13.

At step 108, the process is end.

Accordingly, when receiving the serial data, the receive shift register 11 transmits the serial data to the receiver FIFO 12 and simultaneously sends a signal to the line status register 13; the line status register 13 identifies whether or not the serial data is correct. During the process of receiving the serial data, an end bit should be received after all data bits have been received. If the end bit is not received at that time, then a frame error will occur; or if a parity check mechanism is enabled and the received parity bit is an error, then a parity error will occur, and the parity bit in the line status register 13 is set as an error bit. After all data bits are received, an end bit is received and thus the line status register 13 corresponding to such record of data is set as correct. When the line status register 13 determines the serial data as correct, a signal will be sent to the good data length register 131 for accumulation counting; when the good data length register 131 has no availability, the receiver FIFO 12 will stop receive the serial data; after the serial data has been read out from the good data length register 131 by the microprocessor 2, the receiver FIFO 12 will start to receive the serial data.

When reading the serial data, the microprocessor 2 reads the number of the correct serial data from the good data length register 131 through the bus 3, then, according to the count number of the good data length 131, the microprocessor 2 reads the serial data from the receiver buffer register 14; if an error bit occur during the transmission from the receiver shift register 11 to the receiver buffer register 14, the microprocessor 2 will continue to read error bit data from the line status register 13; if there is no error bit occurred, then further reading is not necessary. Less number of reading times increases the reading efficiency of the microprocessor 2.

Figure 11:
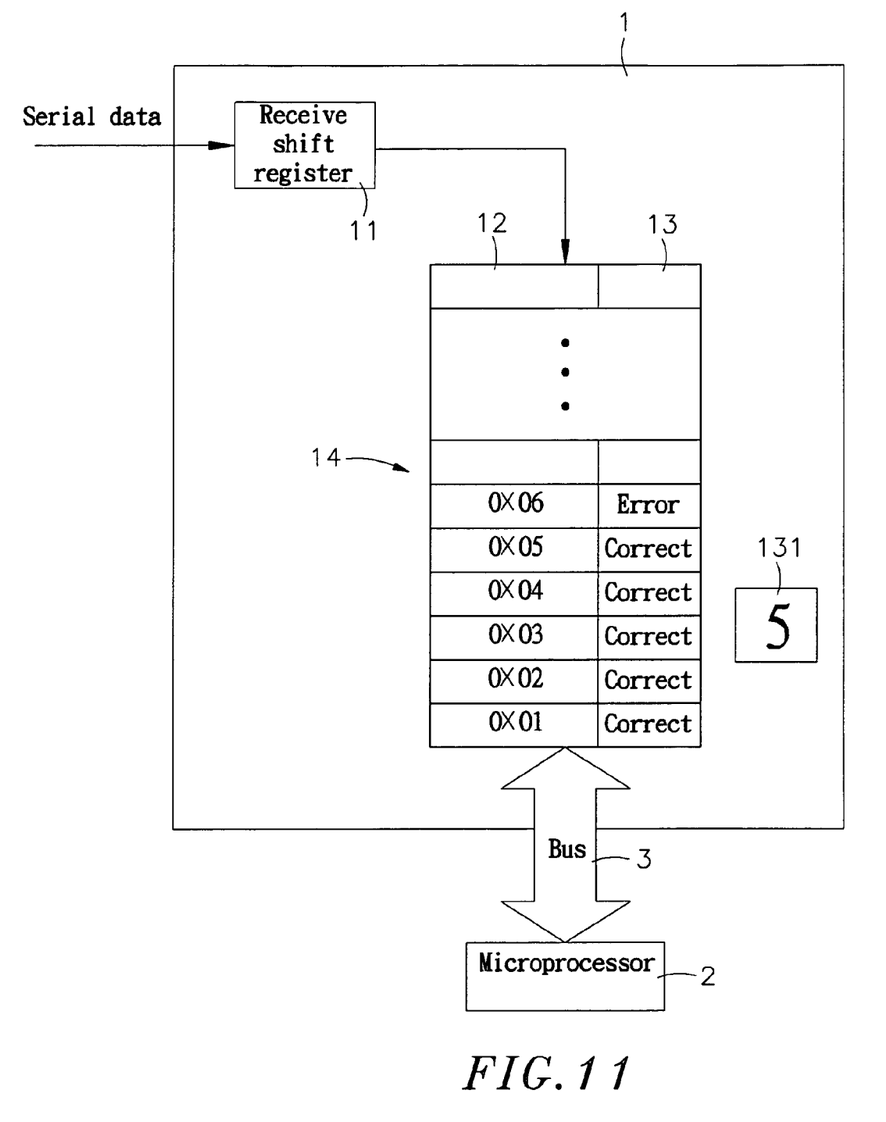
FIG. 11 is a first schematic view of the process for reading data by a universal asynchronous receiver transmitter according to the present invention.
Figure 12:
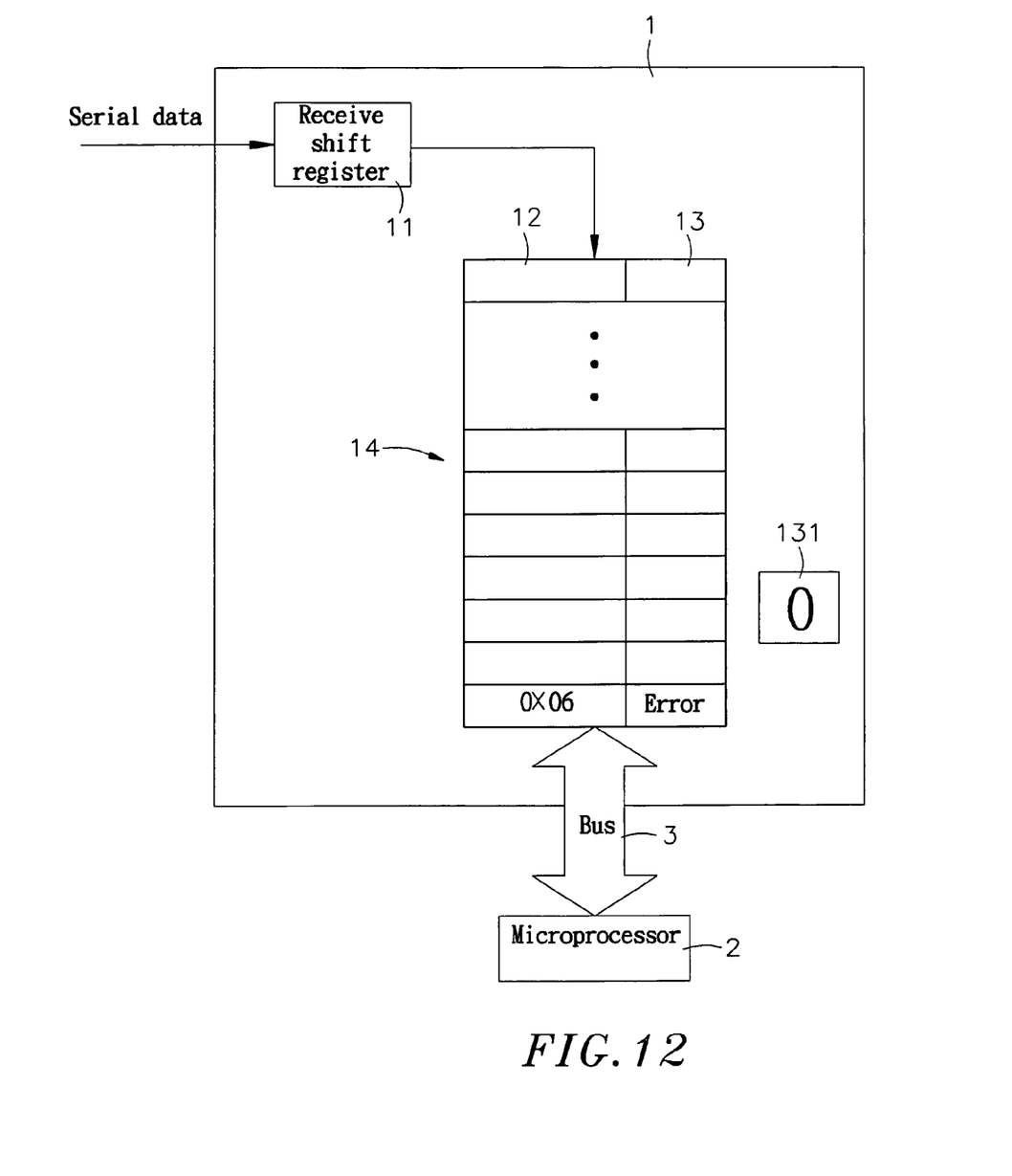
FIG. 12 is a second schematic view of the process for reading data by a universal asynchronous receiver transmitter according to the present invention.
Figure 13:
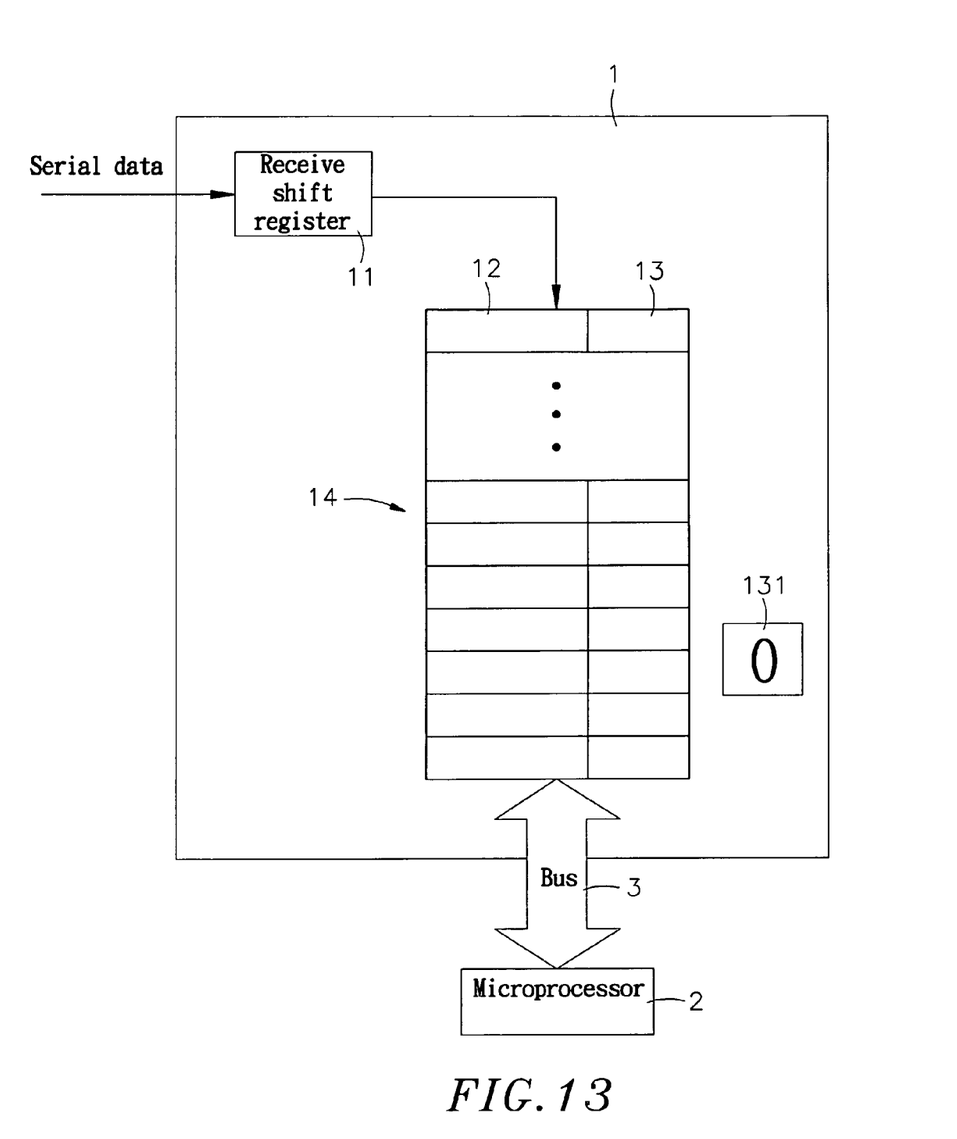
FIG. 13 is a third schematic view of the process for reading data by a universal asynchronous receiver transmitter according to the present invention.

Please refer to FIGS. 11, 12 and 13 for the schematic views of the process for reading data by a universal asynchronous receiver transmitter according to the present invention. In the figures, the six records of data stored in the receiver buffer register 14 are read according to the foregoing preferred embodiment, and the microprocessor 2 only needs to read the universal asynchronous receiver transmitter 1 for eight times. Compared with the prior art that reads the same quantity of data in the same condition for 12 times, therefore, the present invention enhances the performance of reading data as well as the performance of the microprocessor 2.

Therefore, the method for receiving data by a universal asynchronous receiver transmitter in accordance with the present invention emphasizes its claim on adopting a good data length register 131 installed in the universal asynchronous receiver transmitter 1 for counting the number of serial data marked as correct is the aspect in the present invention, which enables the microprocessor 2 to only read the counts recorded in the good data length register 131 as the counts of the correct serial data, thus increase the reading efficiency.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A method for receiving data by a universal asynchronous receiver transmitter, said universal asynchronous receiver transmitter having a receive shift register for receiving a plurality of serial data, and said receive shift register being coupled to a receiver FIFO (RFIFO) and a line status register (LSR) capable of storing the serial data transmitted from said receive shift register, and said receiver FIFO being coupled to a receiver buffer register (RBR) and said line status register being coupled to a good data length register (GDL), and a preinstalled microprocessor connecting to said receiver buffer register, said line status register and said good data length register through a bus, the method comprising the following steps:

1) receiving said serial data by said receive shift register;
2) sending said serial data by said receive shift register to said receiver FIFO, and gauging said serial data received is correct or error and marking the serial data accordingly by said line status register, wherein if the serial data is marked correct, the process proceeds to step (3) and wherein if the serial data is marked error, the process proceeds to step (4);
3) storing said correct serial data into said receiver buffer register by said receiver FIFO and sending a signal into said good data length register by the line status register, and the process proceeds to step (5);
4) storing said error serial data into said line status register by said receive shift register and not sending a signal into said good data length register by the line status register, and the process proceeds to step (5);
5) reading number of correct serial data from the good data length register by said microprocessor through said bus, and reading out the number of correct serial data after being read by the microprocessor;
6) reading said correct serial data from said receiver buffer register by said microprocessor through said bus;
7) comparing the number of correct serial data read from said good data length register with the total number of serial data send from the receive shift register by said microprocessor to check whether the number of correct serial data in said good data length register is the same, wherein if the number of the correct serial data in the good data length register is less than the total number of transmitted serial data, the process proceeds to step (8) and wherein if not, the process proceeds to step (9);
8) reading said error bit from said line status register by said microprocessor; and
9) process end.

2. The method of receiving data by a universal asynchronous receiver transmitter according to claim 1, wherein said counts in said good data length register are read out after being read by said microprocessor, and said good data length register comprises 32 bits, 64 bits or 128 bits.

3. The method of receiving data by a universal asynchronous receiver transmitter according to claim 1, wherein when said receiver FIFO capacity is full, then said receiver FIFO stops receiving the serial data until said serial data has been read out from said microprocessor.

* * * * *